United States Patent
Gonzales

[11] Patent Number: 5,818,668
[45] Date of Patent: Oct. 6, 1998

[54] COMPACT TAPE DRIVE HEAD POSITIONING SYSTEM

[75] Inventor: Curtis Paul Gonzales, Boise, Id.

[73] Assignee: Hewlett-Packard Company, Palo Alto, Calif.

[21] Appl. No.: 900,211

[22] Filed: Jul. 24, 1997

[51] Int. Cl.$^6$ .................................................. G11B 5/55
[52] U.S. Cl. ........................................................ 360/106
[58] Field of Search ................................ 360/104–106, 360/129, 130.21, 130.2, 83

[56] References Cited

U.S. PATENT DOCUMENTS

| | | | |
|---|---|---|---|
| 4,313,143 | 1/1982 | Zarr | 360/106 |
| 4,694,367 | 9/1987 | Brent | 360/106 |
| 4,750,067 | 6/1988 | Gerfast | 360/106 |
| 4,779,149 | 10/1988 | Watanabe | 360/78.13 |
| 4,858,047 | 8/1989 | Cannon et al. | 360/106 |
| 5,414,578 | 5/1995 | Lian et al. | 360/106 |
| 5,438,469 | 8/1995 | Rudi | 360/109 |
| 5,592,351 | 1/1997 | Carter | 360/106 |
| 5,706,149 | 1/1998 | Hoelsaeter | 360/106 |

*Primary Examiner*—Jefferson Evans

[57] ABSTRACT

A read/write tape head structure is utilized to access data from a tape, the tape including plural parallel tracks and exhibiting a tape width W1. The read/write tape head structure includes a fixed tape support which supports linear travel of the tape thereover. The fixed tape support exhibits a width W2 which is substantially the same as tape width W1. A transducer associated with the fixed tape support provides read/write capabilities and exhibits a width w which is less than either W1 or W2. An actuator moves the transducer transversely across tape width W1 to enable a positioning thereof at each of a plurality of parallel tracks on the tape. The actuator moves the transducer so that it physically remains within width W2 of the fixed tape support.

3 Claims, 1 Drawing Sheet

COMPACT TAPE DRIVE HEAD POSITIONING SYSTEM

FIELD OF THE INVENTION

This invention relates to head positioning apparatus for tape recording heads and, more particularly, to a movable tape head arrangement which employs a fixed position tape support and a movable head whose movement excursions are maintained within the confines of the tape support.

BACKGROUND OF THE INVENTION

Personal computers presently use tape back-up systems, wherein the recording tracks on the tape extend lengthwise along the tape. Drive capstans move the tape over a head structure which, in many cases, is movable across the width of the tape to enable a read/write transducer portion of the head structure to be aligned with specific ones of the recording tracks.

Many personal computers are provided with expansion slots wherein add-on units can be added inside the case of the computer. Because the space available for each expansion slot is limited, tape back-up systems that are designed to plug into such an expansion slot are required to exhibit a relatively thin aspect ratio. Accordingly, there are significant constraints on the thickness dimension of such back-up tape drives.

The prior art includes a number of teachings regarding motor/drive techniques for moving a read/write transducer across a tape. In U.S. Pat. No. 4,858,047 to Cannon et al., a stepper motor is coupled to a lead screw which is, in turn, further coupled by additional structure to a read/write head mounting assembly. Operation of the stepper motor enables an incremental movement of the read/write head across a tape. U.S. Pat. No. 4,694,367 to Brent discloses a head movement structure wherein a linear actuator carries a connector which, in turn, couples to a cable with a bracket that is utilized to drive a recording head across a tape. U.S. Pat. No. 4,779,149 discloses a head positioning mechanism which transports a read/write head across the tape between predetermined limit positions.

Referring to FIG. 1, a prior art head structure 10 is illustrated which includes a read/write transducer 12. In order to move transducer 12 across the width of tape 14 so as to enable access to multiple ones of parallel tracks thereon, a motor mechanism (not shown) moves head structure 10 back and forth in the directions indicated by arrows 16. Because head structure 10 must continue to support tape 14, irrespective of the position of read/write transducer 12, head structure 10 is constructed with an oversize width which assures that tape 14 will always be supported, even when read/write to transducer 12 is positioned at an extreme edge of tape 14. Accordingly, the thickness dimension of a tape drive mechanism incorporating head structure 10 must be such as to accommodate the full travel excursions thereof, e.g., about twice the width of tape 14.

An alternative which provides a thinner tape drive mechanism thickness is to cause read/write transducer 12 to be stationary, to extend across the entire width of tape 14 and to be provided with one transducer per track. Due however to transducer magnetic interactions and physical limits, such a structure necessitates greater distances between recording tracks and thus reduces data density on the tape.

Accordingly, it is an object of this invention to provide a read/write tape head structure which whose thickness dimension is minimal, given the width of the tape to be handled.

It is another object of this invention to provide a read/write tape head structure which, while movable to access plural track positions on a tape, exhibits travel excursions that are limited to about the width of the tape.

SUMMARY OF THE INVENTION

A read/write tape head structure is utilized to access data from a tape, the tape including plural parallel tracks and exhibiting a tape width W1. The read/write tape head structure includes a fixed tape support which supports linear travel of the tape thereover. The fixed tape support exhibits a width W2 which is substantially the same as tape width W1. A transducer associated with the fixed tape support provides read/write capabilities and exhibits a width w which is less than either W1 or W2. An actuator moves the transducer transversely across tape width W1 to enable a positioning thereof at each of a plurality of parallel tracks on the tape. The actuator moves the transducer so that it physically remains within width W2 of the fixed tape support.

DETAILED DESCRIPTION OF THE INVENTION

Figure 1:
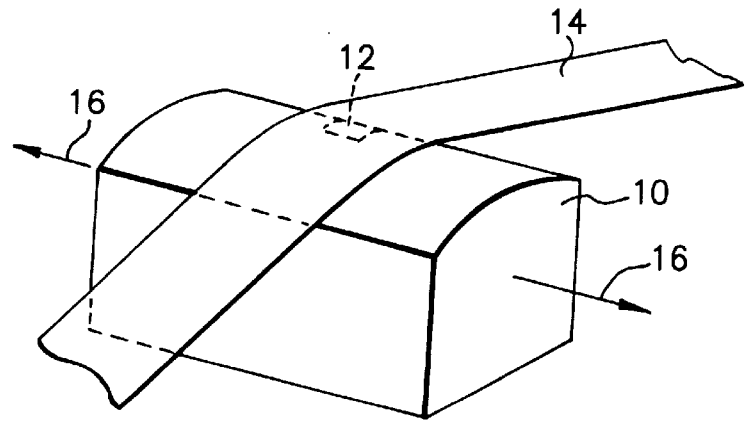
FIG. 1 is a perspective view of a prior art read/write head structure.
Figure 2:
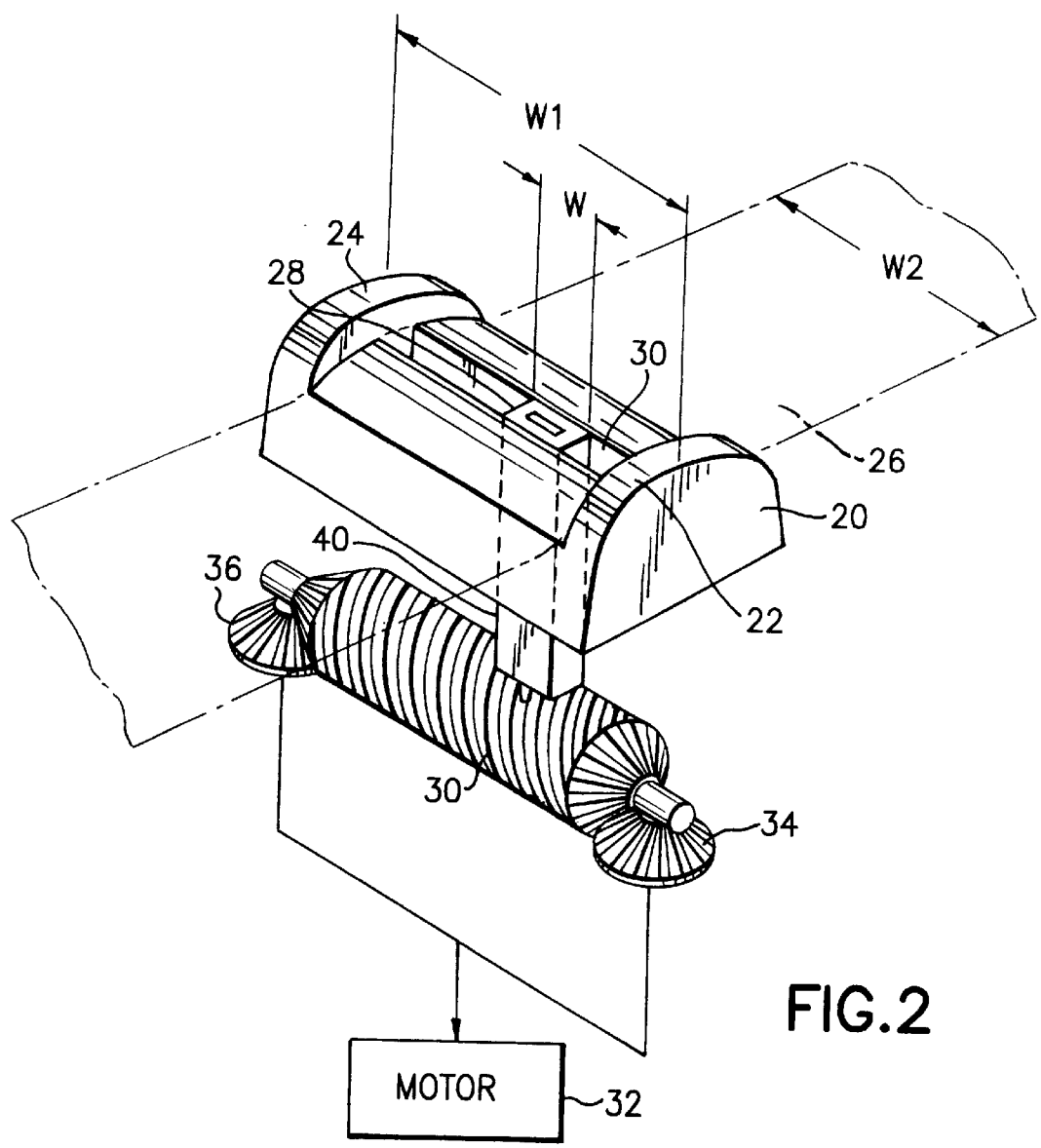
FIG. 2 is a perspective view of a read/write head structure which incorporates the invention.

Referring to FIG. 2, a tape support 20 is fixedly positioned within a tape drive (not shown) and includes a pair of edge guides 22 and 24 for preventing lateral movement of a tape 26 (shown dotted) that passes thereover. Edge guides 22 and 24 are shown with exaggerated thickness relative to the width W1 of tape support 20. Thus, tape 26, which exhibits a width W2 does not differ from width W1 by any appreciable amount, as tape guides 22 and 24 are thin in relation width W1. In fact, edge guides 22 and 24 can be eliminated if other guiding means are provided to assure lateral tape stability on tape support 20.

A read/write transducer 28 is slidably positioned in a slot 30 in tape support 20. Read/write transducer 28 may be positioned at any point along slot 30 so as to enable access to sets of parallel tracks on tape 26. Accordingly, there is no need to move read/write transducer 28 any further than the ends of tape support 20 to enable access to all of the data tracks on tape 26. Thus, a casing for enclosing tape support 20 (and the remaining tape apparatus for moving read/write head 28 and tape 26) merely needs to accommodate the width of tape support 20.

Positioned beneath read/write transducer 28 is an actuating mechanism that comprises a spiral gear 30 that is driven, via gears 34 and 36, by a motor 32. A lower-most portion of read/write transducer 28 includes a follower 40 that engages worm gear 30. Motor 32 may be driven in either direction to cause worm gear 30 to likewise reversibly rotate. Such rotation enables lateral movement of read/write transducer 28 along slot 30 by virtue of the engagement between follower 40 and gear 30.

It is to be understood by those skilled in the art that the actuator mechanism shown in FIG. 2 is one of a number that can be utilized to cause transverse movement of read/write transducer 28 across the width of tape 26 and within the confinement of slot 30. Accordingly, the actuation structure shown in FIG. 2 is merely exemplary and is not to be deemed as limiting the scope of the invention hereof.

In summary, since width W1 of tape support 20 is substantially the same as the width of tape 26 (W2), the overall thickness of a casing enclosing the tape drive mechanism need not take into account any movement of tape support 20. Similarly, the movement of read/write transducer 28 enables any set of tracks on tape 26 to be accessed, while utilizing stationary tape support 20 to provide a stable guide and supporting structure for tape 26.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An apparatus for transfer of data from a tape medium having a width W1 and provided with plural parallel tracks that extend along a length thereof, said apparatus comprising:

a fixed tape support for supporting linear travel of said tape medium, said fixed tape support having an overall width W2 which is substantially the same as width W1 of said tape medium, said fixed tape support further including a pathway oriented transverse to a direction of travel of said tape medium;

a transducer head structure mounted for movement in said pathway with respect to said fixed tape support for reading and writing data from and onto said tape medium, said transducer head structure having a width w which is significantly less than width W1 of said tape medium; and actuator means for moving said transducer head structure across width W1 of said tape medium and for positioning said transducer in said pathway to access data from each of said plural parallel tracks on said tape medium, said actuator means limited to moving said transducer head structure only within confines of said width W2 of said fixed tape support.

2. The apparatus as recited in claim 1 wherein said fixed tape support includes guide structures which confine movement of said tape medium across the width of said tape support.

3. The apparatus as recited in claim 1 wherein said transducer includes a portion which engages said actuator means to enable movement of said transducer head structure in said pathway.

* * * * *